Patented Sept. 3, 1935

2,013,272

UNITED STATES PATENT OFFICE 2,013,272

SPRAY COMPOSITION

Maxwell O. Johnson, Wahiawa, Territory of Hawaii

No Drawing. Application February 24, 1932, Serial No. 594,966

3 Claims. (Cl. 167—43)

This invention is directed to a spray composition and method of making the same for use in connection with plant life and designed particularly for supplying the plant with the needed material and at the same time serving as an effective insecticide.

It was found that a large proportion of the lands which were otherwise suitable for pineapple cultivation in Hawaii, for example, produced yellow, stunted plants and but little fruit. This condition was attributed by investigators to the poisoning of the plants by the large quantities of manganese in the soil.

Pineapple plants, as is well known, are subject to severe injury by insect attack, particularly mealy-bugs, (Pseudococcus brevipes), to which particular insect is attributed the sudden collapse of the plant, commonly known as "pineapple wilt". It has been known that spraying of oil emulsions is of material benefit to pineapple plants, particularly in that it has the effect of destroying the mealy-bugs.

In most oil emulsions for the above purpose, the oil is emulsified with soap or other compounds requiring an alkaline or neutral condition for maintaining the emulsion. It has been discovered by the applicant that spraying the plants with solutions of iron salts appears to neutralize the poisoning attributed to the manganese and results in normal growth and full productivity of the plants. Thus, the desirable solution or spray composition for the effective counteracting of the poison and the destruction of the mealy-bugs suggests an oil emulsion with solutions of iron salts, but where the usual emulsion employed has been mixed with acid solutions of iron salts the emulsion is broken down and the iron is precipitated.

The present invention, aiming to overcome these difficulties, provides a spray composition consisting of water, iron sulphate, clay, and refined mineral oil. In this composition, the oil emulsion is fairly stable and the iron soluble and available to the plant when sprayed. Therefore, the spray composition has the advantage of providing a solution in which iron can be supplied to the leaves of the plants and the mealy-bugs destroyed by the oil emulsion in a single spraying operation. Furthermore, experiments have proven that this particular spray composition is apparently more effective in its destruction of the mealy-bugs than the usual oil emulsion for the reason that the iron salt solution makes the emulsion break somewhat quicker, thus aiding in penetrating the waxy coating of the insect.

In making up the composition, it is preferred to make up first a concentrated oil and iron emulsion by dissolving three pounds of iron sulphate crystals in one gallon of water, then adding two pounds of bentonite or three pounds of fuller's earth or four pounds of pipe or china clay or kaolin, and one gallon of refined mineral oil, the mixture being agitated to form an emulsion. The oil used may be any of the refined mineral oils suitable for spraying on foliage and should preferably have over 85% unsulfonated residue. This for the reason that it is necessary to avoid injury to the plant. The clay used may be any of the colloidal earths similar to those mentioned above. The individual clays have different emulsifying powers so that the optimum proportions vary somewhat for each clay. As defined for the purpose of this invention, the limits of the emulsion appear between 0.5 to 24 pounds of clay per gallon of water and from 0.15 to 3 gallons of water to the gallon of oil. The invention contemplates the use of other soluble iron salts, though iron sulfate is preferable, and the particular sulphate referred to is the ordinary green crystals of ferrous sulphate with seven molecules of water of crystallization. Preferably three or two pounds of crystallized iron sulphate is used per gallon of water in the concentrated oil and iron emulsion, but this amount may be varied from 0.25 of a pound of iron sulphate up to sufficient iron sulphate for a saturated solution.

This concentrated oil and iron emulsion is diluted for use in spraying on plants. When 10 gallons of this concentrated emulsion are sprayed monthly after dilution with from 30 to 1000 gallons of water (depending on the sprayer used) the treatment will satisfy the iron requirements of the pineapple plant and also keep it free from the injurious effects of mealy-bugs.

It is also contemplated within the disclosure of the within invention that a concentrated oil emulsion may be first made up and this emulsion added to solutions of iron sulphate. Under these circumstances, it is preferred to make up first a concentrated oil emulsion by adding two pounds of clay to one gallon of water and two gallons of refined mineral oil, the mixture being agitated to form an emulsion. This concentrated oil emulsion is then added to solutions of iron sulphate. The iron sulphate is dissolved in the water at a rate depending on the amount of iron it is desired to distribute per acre. Preferably, 0.35 to 6 ounces of crystallized iron sulphate is used per gallon of water, it being indicated for the purpose of this invention that the limits of this solution appear between 0.10 and 12 ounces per gallon. The oil emulsion is mixed with the iron sulphate solution with regard to the amount of oil it is desired to distribute per acre. Ordinarily it is preferred to use approximately one gallon of the concentrated oil emulsion to sixty gallons of the iron sulphate solution but, of course, these proportions may be varied between one gallon of emulsion to two hundred gallons of the iron sulphate solution as a maximum and one gallon of the concentrated oil emulsion to five gallons of the iron sulphate solution as a minimum.

It is to be understood that conditions may readily vary the proportion of the ingredients making up the solutions. These may be determined by the character of the sprayer, the relative needs of the particular plants for iron, and the relative amounts of oil necessary to kill the mealy-bugs under particular conditions. Experience has demonstrated that ordinarily the ingredients are so mixed as to distribute about ten pounds, with the minimum and maximum limits of two and thirty pounds, of iron sulphate per acre, and about five gallons of oil in emulsion, with the minimum and maximum limits of the latter from two gallons to twelve gallons.

The solution may be applied to the plants in any desired manner, preferably by spraying, and will be found effective to deliver to the plants in one single operation the iron necessary for maintaining the effective and proper growth of the plants and the oil necessary for the destruction of the mealy-bugs.

I claim:—

1. A spray composition consisting of water, iron salts, clay and refined mineral oil, the whole constituting a stable emulsion until sprayed and a quick breaking emulsion on being sprayed.

2. A spray composition consisting of water, iron salts, colloidal earth and refined mineral oil, the whole constituting a stable emulsion until sprayed and a quick breaking emulsion on being sprayed.

3. A spray composition consisting of water, iron sulphate, clay, and refined mineral oil, the whole constituting a stable emulsion until sprayed and a quick-breaking emulsion on being sprayed to deliver the oil or an insecticide and the iron as a plant protector against plant poisoning.

MAXWELL O. JOHNSON. [L. S.]